Dec. 29, 1964  L. FRANCIS  3,162,880
FEATHER DUSTER
Filed Sept. 25, 1963

INVENTOR.
LOUIS FRANCIS
BY
Kimmel & Crowell
ATTORNEYS.

3,162,880
FEATHER DUSTER
Louis Francis, 650 NE. 64th St., Miami 38, Fla.
Filed Sept. 25, 1963, Ser. No. 311,484
1 Claim. (Cl. 15—234)

This invention relates to feather dusters.

Heretofore, feather dusters of the conventional type long known in the industry have always consisted of a group of feathers, all of the same kind, sometimes whole feathers, and sometimes split feathers. These feathers are usually either stiff feathers, like for example, turkey feathers, or are soft feathers, like for example, ostrich feathers. In some instances the normally stiff feathers have been divided longitudinally to give them softness.

In any case, the dusters as heretofore constructed have been generally useful for a single purpose and have had a limited life of use before they wore out.

It is well recognized that different kinds of feather dusters are required to do a given job. For example, a soft feather duster will lift certain kinds of dust but will not move others so that for one job stiff feathers are needed and for another, only soft feathers can be used.

It is the primary object of my invention to provide a feather duster comprised of a cluster of more than one kind of feathers with the feathers arranged in a novel combination and arrangement whereby one feather duster so constructed can be utilized to do the work which heretofore required two or more different separate dusters, and further, to provide by my invention, an arrangement whereby the useful life of the feather duster is considerably prolonged.

Another object of this invention is to provide, in a manner as hereinafter described and shown, a feather duster comprised of a combination of soft feathers and stiff feathers not only to thereby provide a duster useful for more than one type of dusting but also wherein the soft and the stiff feathers coact to reinforce and to supplement the actions of one another.

A further object of this invention is to provide unique arrangements of combinations of different kinds of feathers.

Still another object of this invention is to provide a feather duster comprised of combinations of turkey feathers and ostrich feathers or feathers functionally equivalent thereto.

Yet another object of this invention is to provide a feather duster comprised of a combination of different kinds of feathers, whereby the duster will perform a wiping and lifting action and at the same time have sufficient rigidity to lift and remove cobwebs and whereby the cobwebs can readily and easily be shaken off and removed from the duster.

Another object of this invention is to provide a combination and arrangement of stiff and soft feathers, for example, turkey feathers and ostrich feathers whereby the ostrich feathers will reinforce and preserve the turkey feathers against breaking.

Another object of this invention is to provide a feather duster having increased static electricity properties whereby the power of the duster to attract and hold dust is increased and to accomplish this by having two or more different kinds of feathers, it being found by me that the rubbing action of the various kinds of feathers against each other, in the use of the duster has this effect.

Still other objects reside in the combination of elements, arrangement of parts, and features of construction, all as are more fully pointed out hereinafter and shown in the accompanying drawings.

In the drawings.

Similar reference characters refer to similar parts throughout the several views of the drawings.

Figure 1:
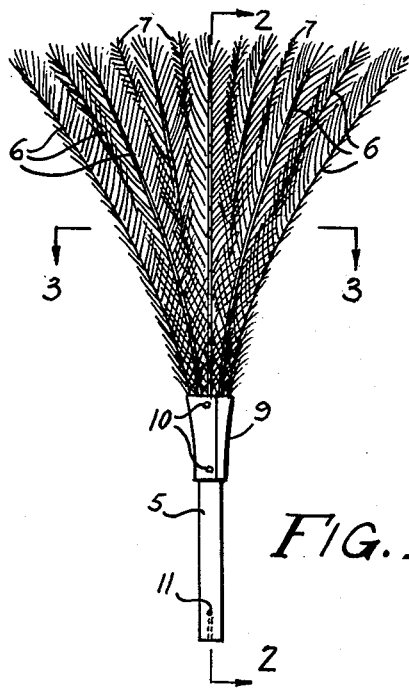
FIGURE 1 is a view in elevation of the invention in which the duster is supported vertically on a suitable handle means.
Figure 2:
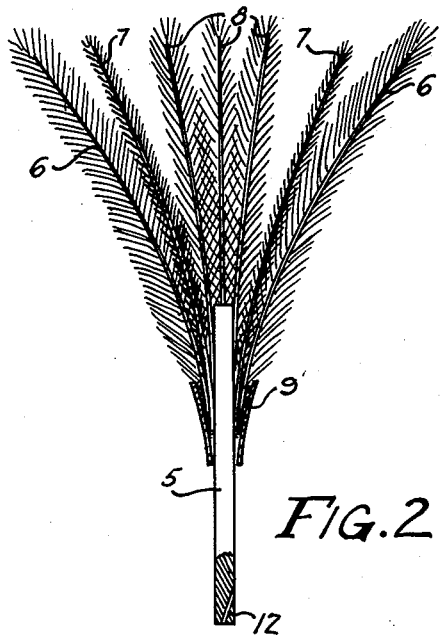
FIGURE 2 is a view of FIGURE 1 taken on lines 2—2 in the direction of the arrows, showing a cross section of the duster portion and partial sectional view of the supporting handle means.
Figure 3:
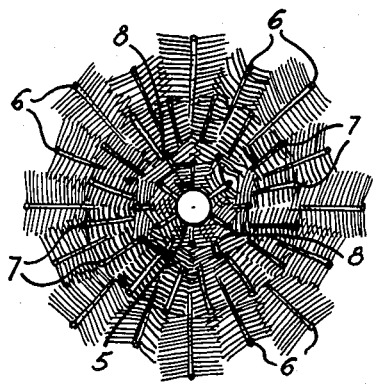
FIGURE 3 is a sectional view of the duster means of FIGURE 1, taken on lines 3—3, in the direction of the arrows.

Referring now to the drawings in detail, there is generally indicated at the lower portion of FIGURES 1 and 2, an elongated supporting handle means 5, at the upper end of which is secured an outer concentric ring of ostrich feathers 6 enclosing an inner concentric ring of turkey feathers 7, which encircle an inner concentric center ring portion of ostrich feathers 8 all conventionally secured by flared ferrule means 9 to the external surfaces of the upper end portion of handle means 5, as shown in FIGURES 1, 2, and 3. Handle means 5 may be made of a suitable material. Flared ferrule means 9 may be secured by suitable fastening means 10 to near the end of handle means 5, as desired. The lower end of handle means 5 of FIGURES 1 and 2 may be made to include any suitable attachment means 11 and 12, whereby handle means 5 may be secured to an extension handle portion (not shown) as taught in my prior Patent No. 2,867,831, of January 13, 1959, to be used for cleaning and dusting articles, ceilings, etc. at ordinarily inaccessible heights to remove dirt, dust, cobwebs and the like.

The instant invention employs two different kinds of feathers in a clustered feather duster in a unique structural arrangement to obtain flexibility and at the same time a desired stiffness of duster that makes it suitable for universal use. For example, in using two different kinds of feathers having different static charge characteristics in the herein described structural arrangement, there is a sliding or rubbing action between the two kinds of feathers. This creates a static electrical charge which aids in picking up and holding large quantities of dirt and dust particles. This permits the dust load to be easily dropped from the duster cluster by shaking it out. The instant duster is novel in its mode of operation, and in its adaptability to various uses.

The unique arrangement provides a reinforcement for the ostrich feathers which are softer than the turkey feathers while at the time time, the ostrich feathers act as a protection for the turkey feathers which are stiffer as a protection against breakage of the latter. As is well known, the feathers in a feather duster flex during the use of the duster and depending on the amount of pressure exerted, and the stiffness of the feathers, there is a tendency towards breakage of the stiff feathers. However, soft feathers will not alone suffice to dig out embedded dirt or entirely lift cobwebs, and hence, a combination of the two, especially with the softer feathers on the outside, makes an ideal multi-purpose duster, as herein provided.

From the foregoing it will be seen that there is herein provided an improved and novel clustered duster which accomplishes all the objects of this invention, and others, including many advantages of great practical utility and commercial importance.

It should be understood, of course, that the foregoing disclosure relates to only a preferred embodiment of he invention and that it is intended to cover all changes and modifications of the example of the invention herein chosen for the purposes of the disclosure, which do not consituted departures from the spirit and scope of the invention set forth in the appended claim.

I claim:

In a feather duster the combination comprising,
(1) an elongated handle member,
(2) a cluster of feathers extending away from near one end of the handle member,
(3) said cluster including a first center circle of relatively soft feathers, such as ostrich feathers,
(4) a second closely adjacent surrounding circle of relatively stiff feathers, such as turkey feathers,
(5) a third closely adjacent outer circle of relatively soft feathers of the type first recited,
(6) all of said feathers being of substantially the same length,
(7) a flared shape ferrule clampingly surrounding the inner ends of the feathers,
(8) and means securing the ferrule to near said one end of said handle,
(9) whereby the feather ends are held therein.

References Cited by the Examiner
UNITED STATES PATENTS

| | | | |
|---|---|---|---|
| 77,278 | 4/68 | Goodenough | 15—234 |
| 144,779 | 11/73 | Lyle | 15—234 |
| 171,488 | 12/75 | Stoll | 15—234 |
| 385,070 | 6/88 | Richmond | 15—234 |

CHARLES A. WILLMUTH, *Primary Examiner.*